United States Patent
Habib et al.

(10) Patent No.: US 9,958,278 B2
(45) Date of Patent: May 1, 2018

(54) NAVIGATION SYSTEM WITH SCALABLE DISPLAY MECHANISM AND METHOD OF OPERATION THEREOF

(71) Applicant: Telenav, Inc., Sunnyvale, CA (US)

(72) Inventors: Md Ahsan Habib, Santa Clara, CA (US); Shah Asaduzzaman, Sunnyvale, CA (US); Dmitri Azovtsev, Sunnyvale, CA (US); Harris Warren, Los Gatos, CA (US); Mark Jason Scalf, San Jose, CA (US); Zhenhua Zhou, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 0 days. days.

(21) Appl. No.: 14/597,089

(22) Filed: Jan. 14, 2015

(65) Prior Publication Data
US 2016/0202070 A1   Jul. 14, 2016

(51) Int. Cl.
*G01C 21/26* (2006.01)
*G01C 21/36* (2006.01)

(52) U.S. Cl.
CPC ......... *G01C 21/26* (2013.01); *G01C 21/3688* (2013.01)

(58) Field of Classification Search
CPC . H04L 67/12; G01C 21/3453; G01C 21/3469; G01C 21/367; G01C 21/3682; G06T 11/203; G06T 9/00; G06T 9/20; H04N 19/00; H04W 4/02; H04W 4/046; H04W 4/20
USPC .................. 701/533; 345/660, 173; 717/173; 463/23; 719/313; 726/22, 30; 707/1; 706/12; 382/128; 715/835; 455/446
See application file for complete search history.

(56) References Cited

U.S. PATENT DOCUMENTS

| | | | |
|---|---|---|---|
| 7,460,953 B2 | 12/2008 | Herbst et al. | |
| 8,112,720 B2 | 2/2012 | Curtis | |
| 8,522,144 B2 | 8/2013 | Lyons et al. | |
| 2003/0231190 A1* | 12/2003 | Jawerth | G06T 9/00 345/660 |
| 2006/0129522 A1* | 6/2006 | Itterbeck | H04L 67/1095 |
| 2006/0276196 A1* | 12/2006 | Jiang | H04L 12/66 455/446 |
| 2008/0016468 A1* | 1/2008 | Chambers | G06F 3/0485 715/835 |
| 2009/0240427 A1* | 9/2009 | Siereveld | G01C 21/3469 701/533 |
| 2011/0216953 A1* | 9/2011 | Callahan | G06K 9/00 382/128 |
| 2013/0219381 A1* | 8/2013 | Lovitt | G06F 8/65 717/173 |
| 2013/0325319 A1 | 12/2013 | Moore et al. | |
| 2014/0082541 A1 | 3/2014 | Olausson et al. | |
| 2014/0128144 A1* | 5/2014 | Bavitz | A63F 9/24 463/23 |

(Continued)

*Primary Examiner* — Anne M Antonucci
*Assistant Examiner* — Sanjeev Malhotra
(74) *Attorney, Agent, or Firm* — Perspectives Law Group

(57) ABSTRACT

A method of operation of a navigation system includes: determining a device capability for an embedded device; receiving unprocessed map information based on the device capability; generating a natively rendered map layer on a mobile device with the unprocessed map information; generating a map overlay for layering over the natively rendered map layer; and generating a navigation interface with the map overlay and the natively rendered map layer for displaying on the embedded device.

20 Claims, 6 Drawing Sheets

(56) References Cited

U.S. PATENT DOCUMENTS

| | | | |
|---|---|---|---|
| 2014/0215491 A1* | 7/2014 | Addepalli | H04W 4/046 |
| | | | 719/313 |
| 2014/0283142 A1* | 9/2014 | Shepherd | G06F 3/0482 |
| | | | 726/30 |
| 2015/0062020 A1* | 3/2015 | Pourbigharaz | G06F 3/041 |
| | | | 345/173 |
| 2015/0150124 A1* | 5/2015 | Zhang | H04L 63/1408 |
| | | | 726/22 |
| 2016/0063209 A1* | 3/2016 | Malaviya | G06F 19/3431 |
| | | | 706/12 |

* cited by examiner

NAVIGATION SYSTEM WITH SCALABLE DISPLAY MECHANISM AND METHOD OF OPERATION THEREOF

TECHNICAL FIELD

An embodiment of the present invention relates generally to a navigation system, and more particularly to a system for scalable display.

BACKGROUND

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One consumer electronics growth, where mobility is quintessential, is in location based services, such as navigation systems utilizing satellite-based Global Positioning System (GPS) devices. Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest. The real-time information provides invaluable relevant information, when available or in service areas. The relevant information is also invaluable when service is not available as well.

Thus, a need still remains for a navigation system with scalable display mechanism to accommodate various secondary displays. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including: a control unit configured to: determine a device capability for an embedded device; receive unprocessed map information based on the device capability; generate a natively rendered map layer on a mobile device with the unprocessed map information; generate a map overlay for layering over the natively rendered map layer; generate a navigation interface with the map overlay and the natively rendered map layer; and a communication unit, coupled to the control unit, configured to: transmit the navigation interface for displaying on the embedded device.

An embodiment of the present invention provides a method including: determining a device capability for an embedded device; receiving unprocessed map information based on the device capability; generating a natively rendered map layer on a mobile device with the unprocessed map information; generating a map overlay for layering over the natively rendered map layer; and generating a navigation interface with the map overlay and the natively rendered map layer for displaying on the embedded device.

A non-transitory computer readable medium including instructions for operating a navigation system including: determining a device capability for an embedded device; receiving unprocessed map information based on the device capability; generating a natively rendered map layer on a mobile device with the unprocessed map information; generating a map overlay for layering over the natively rendered map layer; and generating a navigation interface with the map overlay and the natively rendered map layer for displaying on the embedded device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
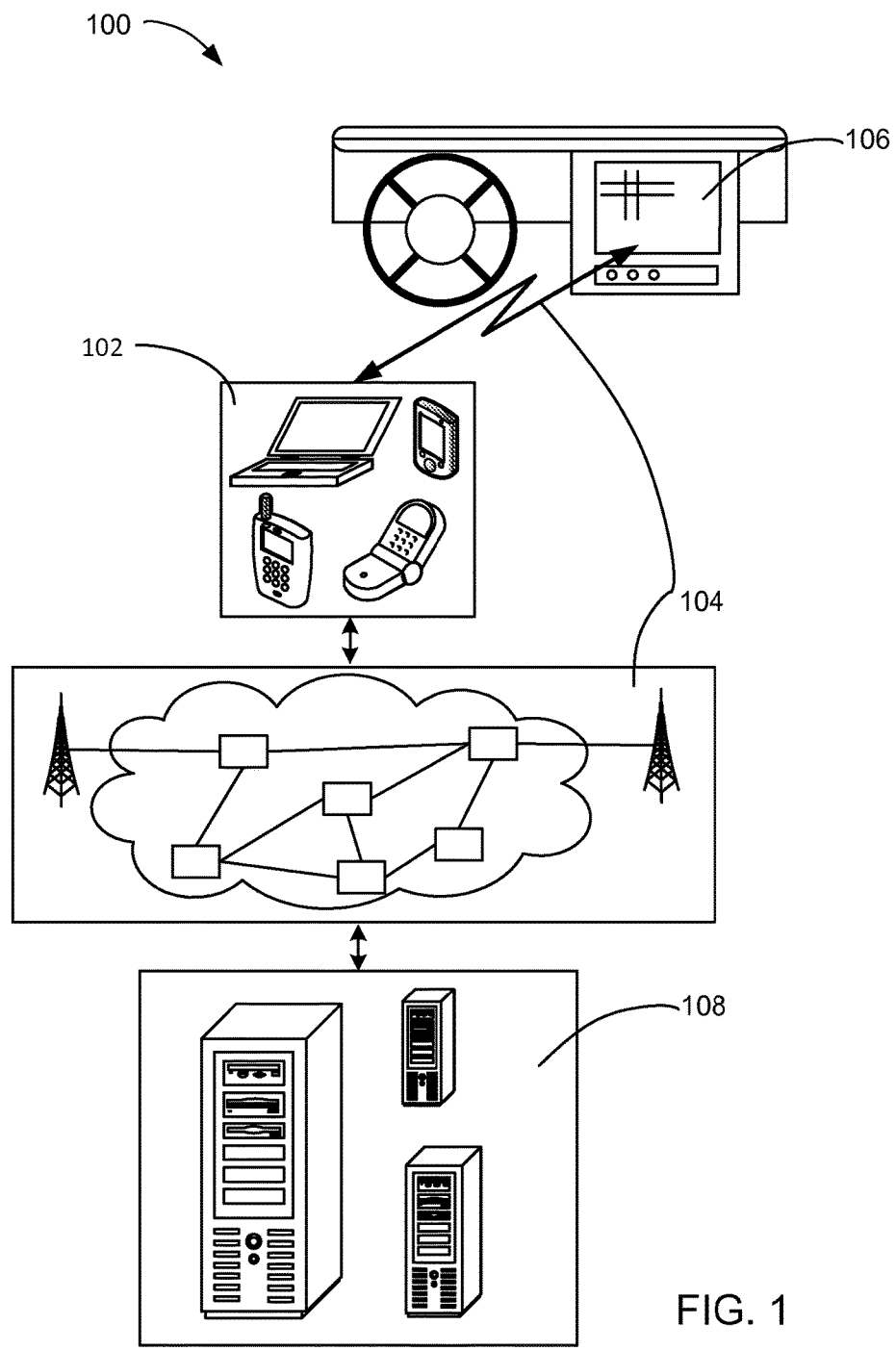
FIG. 1 is a navigation system with scalable display mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc.

as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with scalable display mechanism in an embodiment of the present invention. The navigation system 100 includes a first device 102, such as a client or a server, connected to a second device 106, such as a client or server. The navigation system 100 can further include a host device 108, such as a client or a server, connected to the first device 102, the second device 106, or a combination thereof. The first device 102, the second device 106, the host device 108, or a combination thereof can communicate using a communication path 104, such as a wireless or wired network.

For example, the first device 102, the second device 106, or a combination thereof can be of any of a variety of devices, such as a cellular phone, personal digital assistant, a notebook computer, automotive telematics navigation system, or other multi-functional mobile communication or entertainment device. The first device 102, the second device 106, or a combination thereof can couple, either directly or indirectly, to the communication path 104 to communicate with each other, the host device 108, or a combination thereof or can be standalone devices. The first device 102, the second device 106, or a combination thereof further can be separate form or incorporated with a vehicle, such as a car, truck, bus, or train.

For illustrative purposes, the navigation system 100 is described with the first device 102 as a mobile computing device and the second device 106 as a device incorporated with a vehicle. However, it is understood that the first device 102 and the second device 106 can be different types of devices. For example, the first device 102 can also be a non-mobile computing device, such as a server, a server farm, or a desktop computer and the second device 106 can also be a mobile computing device, such as a laptop or a tablet computer.

The host device 108 can be any of a variety of centralized or decentralized computing devices, or video transmission devices. For example, the host device 108 can be a computer, grid computing resources, a virtualized computer resource, cloud computing resource, routers, switches, peer-to-peer distributed computing devices, or a combination thereof.

The host device 108 can be centralized in a single room, distributed across different rooms, distributed across different geographical locations, embedded within a telecommunications network. The host device 108 can couple with the communication path 104 to communicate with the first device 102, the second device 106, or a combination thereof. The host device 108 can also be a client type device as described for the first device 102.

For illustrative purposes, the navigation system 100 is described with the host device 108 as a non-mobile computing device, although it is understood that the host device 108 can be different types of computing devices. For example, the host device 108 can also be a mobile computing device, such as notebook computer, another client device, or a different type of client device. The host device 108 can be a standalone device, or can be incorporated with a vehicle, such as a car, a truck, a bus, or a train.

Also for illustrative purposes, the navigation system 100 is described with the host device 108 as a computing device, although it is understood that the host device 108 can be different types of devices. Also for illustrative purposes, the navigation system 100 is shown with the first device 102, the second device 106, and the host device 108 as end points of the communication path 104, although it is understood that the navigation system 100 can have a different partition between the first device 102, the second device 106, the host device 108, and the communication path 104. For example, the first device 102, the second device 106, the host device 108, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, near field communication (NFC), Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
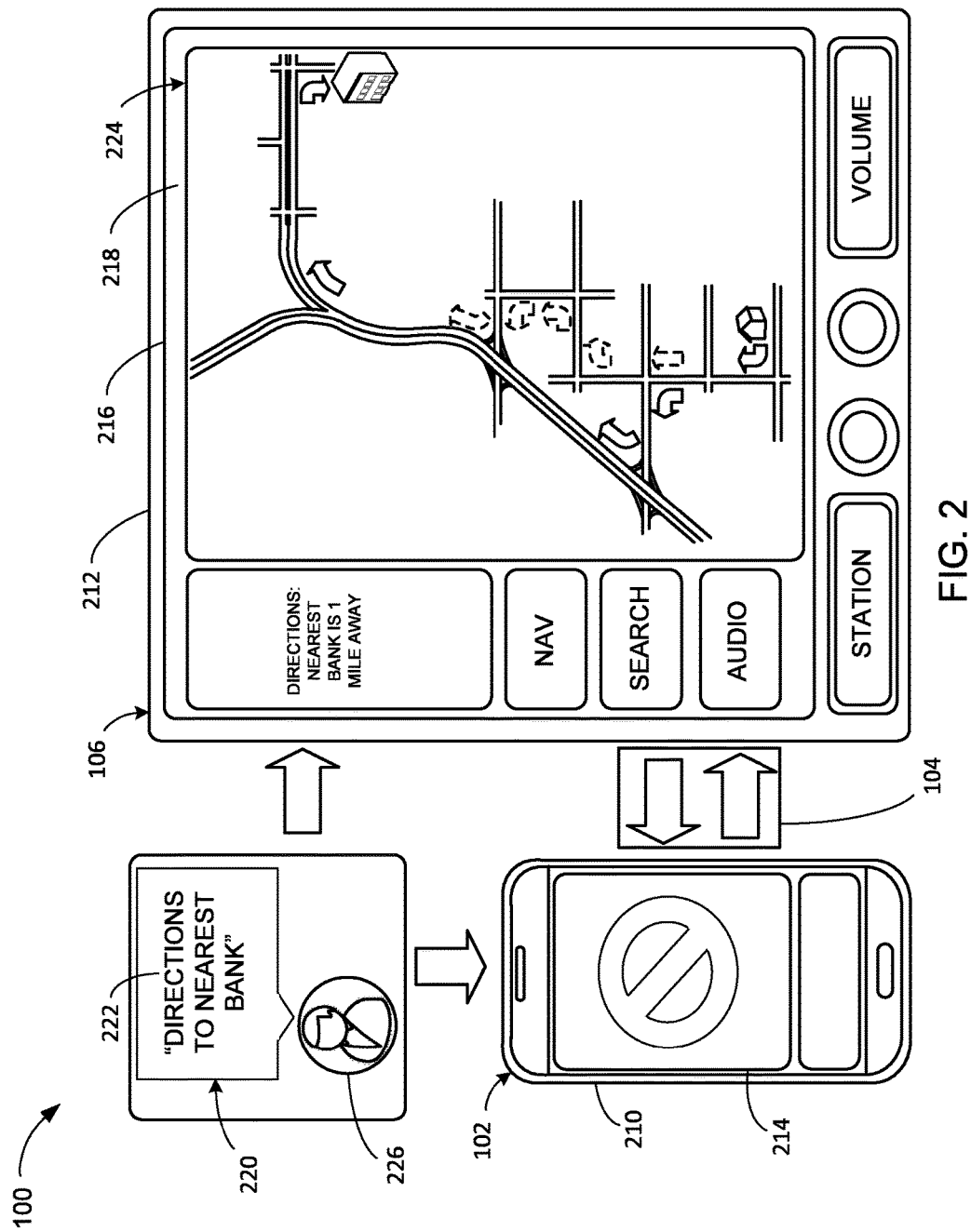
FIG. 2 is an example of the first device and the second device of FIG. 1.

Referring now to FIG. 2, therein is shown an example of the first device 102 and the second device 106 of FIG. 1. As an example, the first device 102 as a mobile device 210 and the second device 106 as an embedded device 212. The mobile device 210 is defined as a portable or mobile computing device having the capability to generate and render maps from unprocessed or raw map information and generate a user interface for presentation on other devices. The mobile device 210 can be any of a variety of devices, such as a cellular phone, a smart phone, a personal digital assistant, a tablet computer, a notebook computer, an automotive telematics navigation system, or other multi-functional mobile communication or entertainment device. For this example, the mobile device 210 can be a cellular phone, smart phone, or tablet computer. The mobile device 210 can include a mobile device display 214, such as a monitor, display screen, or display interface, for displaying information.

The embedded device 212 is defined as a device that is fixed or embedded in a vehicle and capable of receiving and presenting a user interface and rendered maps. The embedded device 212 can be any variety of devices, such as an automotive telematics navigation system, display interface, a vehicle heads-up display unit, a vehicle integrated dashboard or console display unit, or other multi-functional communication or entertainment device. For this example, the embedded device 212 the can be a vehicle heads-up display unit or vehicle integrated dashboard or console display unit. The embedded device 212 can include an embedded device display 216, such as a monitor, display screen, or display interface, for displaying information.

The embedded device 212 can be functionally connected with the mobile device 210. The mobile device 210 and the embedded device 212 are functionally connected when the mobile device 210 and the embedded device 212 are capable of mutual information exchange. Examples of mutual information exchange can include transmission of information from the mobile device 210 to the embedded device 212 for display on the embedded device display 216 or receipt of user input information by the mobile device 210 that is transmitted by the embedded device 212. The embedded device 212 and the mobile device 210 can be functionally connected through the communication path 104.

The navigation system 100 can present a scalable interface 218 on the embedded device 212. The scalable interface 218 is defined as an interface generated based on the capabilities of the device that will present the interface. The scalable interface 218 can be based on the capabilities of the device by tailoring or customizing the functionality, presentation, or a combination thereof of the scalable interface 218 to incorporate or accommodate the capabilities, such as display, input, output, or other interface capabilities, of the embedded device 212. For example, the scalable interface 218 can be a user interface for presentation on the embedded device display 216. In another example, the scalable interface 218 can be generated based on the interface capabilities of the embedded device 212, such as buttons and touch screen capability, and display capabilities, such as screen size and resolution. As a specific example, the scalable interface 218 can include arrangement of visual interface components, such as size and spacing of the interface layout, font size, display areas dimensions, number and arrangement buttons and menus. Further, the scalable interface 218 can be generated to utilize the physical interface components of the embedded device 212, such as buttons, dials, or knobs attached or adjacent to the embedded device display 216, or those associated with the embedded device 212, such as buttons attached to the steering wheel of the vehicle.

The navigation system 100 can receive a user request 220 from the device user 226. The user request 220 can include various actions requested by the device user 226. For example, the user request 220 can be actions related to operation of the vehicle, request for information, or execution of a task. As a specific example, the user request 220 can be requests for temperature control, volume control, directions, search, retrieval of vehicle information, change of interface or display. As another specific example, the user request 220 can include a navigation request 222.

The navigation request 222 is defined as a request to provide information associated one or more physical locations. For example, the navigation request 222 can be a request to generate a travel route between two locations or a search for points of interest relative to a specific location, such as the current location of the device user. As a specific example, the navigation request 222 can be a request to generate a travel route from the current location of the device user to a destination location, such as "directions to the nearest bank." In another specific example, the navigation request 222 can be a request to find and display types of locations, points of interest, or information related to the locations or points of interest, such as "where are the nearest grocery stores?" or "show restaurants near me."

The navigation system 100 can receive the user request 220 that can include the navigation request 222 through the scalable interface 218 presented on the embedded device 212. For example, the navigation request 222 can be received through a virtual keyboard or buttons on the scalable interface 218, peripheral inputs, such as buttons attached or adjacent to the embedded device 212, or voice commands.

In this example, the user request 220 is received through the scalable interface 218 presented on the embedded device 212 and transmitted to the mobile device 210 through the communication path 104. More specifically, for this example, the embedded device 212 provides the all the interface, input, and output capabilities for interaction with the device user 226, although it is understood that the interface, input, and output, capabilities can be partitioned differently between the embedded device 212 and the mobile device 210, which will be discussed in greater detail below. To further the example, the mobile device 210 can receive and process the navigation request 222 to generate a navigation interface 224 for presentation on the embedded device 212, the mobile device 210, or a combination thereof. More specifically, the mobile device 210 performs all control functions, such as generation and adjustment of the scalable interface 218 or processing of the user request 220, for presentation on the embedded device 212. Both the embedded device 212 and the mobile device 210 can include information transfer or communication hardware or units for transfer or transmission of information between the devices through the communication path 104.

The navigation interface 224 is defined as an interface generated in response to a request associated with navigation. The navigation interface 224 can be an interface generated in response to the navigation request 222. For example, the navigation interface 224 can include a rendered map, navigation instructions, overlays for the rendered map that include information associated with the navigation request 222, such as the current location of the device user 226, points of interest, travel route information, or a combination thereof. The navigation interface 224 can be presented in different configurations on the embedded device 212, the mobile device 210, or a combination thereof, based on the mode of operation, which will be discussed in greater detail below.

For illustrative purposes, the navigation system 100 is depicted with the navigation interface 224 presented on the scalable interface 218 of the embedded device 212 while the mobile device display 214 of the mobile device 210 presents a screen lock or suspended interaction message, although it is understood that the navigation system 100 can operate in different configurations. For example, the navigation interface 224 can be presented simultaneously in different presentation formats on both the mobile device display 214 and the embedded device display 216.

Figure 3:
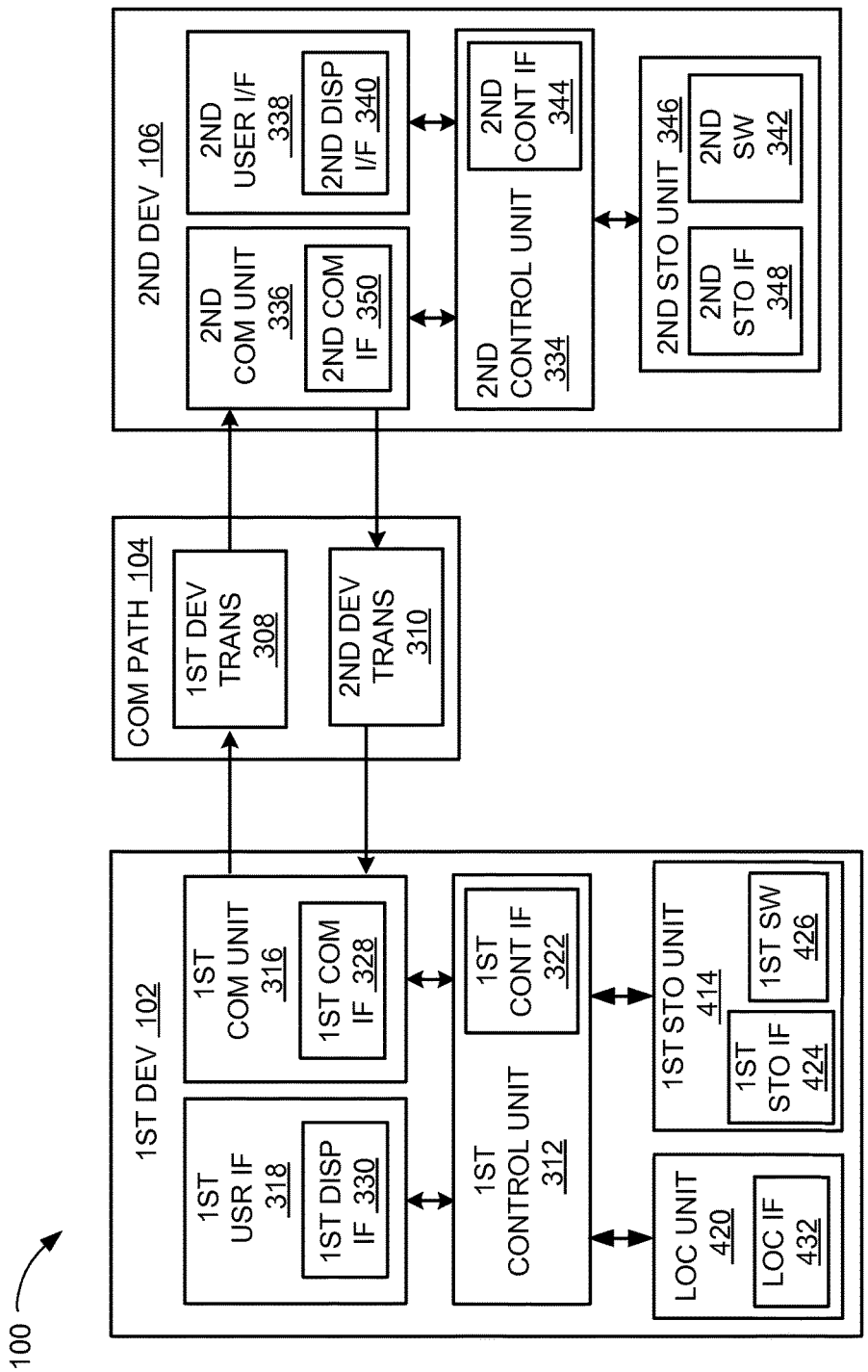
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 and the second device 106 as client devices, although it is understood that the navigation system 100 can have the first device 102 and the second device 106 as different type of devices. For example, the first device 102, the second device 106, or a combination thereof can be a server having a display interface. The first device 102 can include the mobile device 210 of FIG. 2 and the second device 106 can include the embedded device 212 of FIG. 2.

For brevity of description in this embodiment of the present invention, the first device 102 and the second device 106 will be described as client devices. The embodiment of the present invention is not limited to this selection for the type of devices. The selection is an example of an embodiment of the present invention.

The first device 102 can include a first control unit 312, a first storage unit 314, a first communication unit 316, and a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC), an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, the host device 108 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a graphics processing unit (GPU) and a first display interface 330. The first display interface 330 can include a display, a projector, a video screen, a speaker, or any combination thereof. The first display interface 330 can include the display interface 202 of FIG. 2.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The location unit 320 can generate location information, current heading, current acceleration, and current speed of the first device 102, as examples. The location unit 320 can be implemented in many ways. For example, the location unit 320 can function as at least a part of GPS, an inertial navigation system, a cellular-tower location system, a pressure location system, or any combination thereof. Also, for example, the location unit 720 can utilize components such as an accelerometer, a gyroscope, GPS receiver, or a combination thereof.

The location unit 320 can include a location interface 332. The location interface 332 can be used for communication between the location unit 320 and other functional units in the first device 102. The location interface 732 can also be used for communication external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can also provide optimized display interface compared to the first device 102, such as a bigger screen or a higher definition. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, touch screen, soft-keys, a keyboard, a microphone, or any combination thereof to provide data and communication inputs. Examples of the output device of the second user interface 338 can include a second graphics processing unit and a second display interface 340. The second display interface 340 can include a display, a projector, a video screen, a speaker, or any combination thereof. The second display interface 340 can also include the further display 204 of FIG. 2.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102, the host device 108, or a combination thereof over the communication path 104.

The second control unit 334 can be implemented in a number of different manners. For example, the second control unit 334 can be a processor, an application specific integrated circuit (ASIC), an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

The first device 102, the second device 106, or a combination thereof can similarly communicate and interact with the host device 108. Details for the host device 108 will be described below.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106, the host device 108, and the communication path 104.

The functional units in the second device 106 can work individually and independently of the other functional units. The second device 106 can work individually and independently from the first device 102, the host device 108, and the communication path 104.

For illustrative purposes, the navigation system 100 is described by operation of the first device 102 and the second device 106. It is understood that the first device 102, the second device 106, and the host device 108 can operate any of the modules and functions of the navigation system 100.

Figure 4:
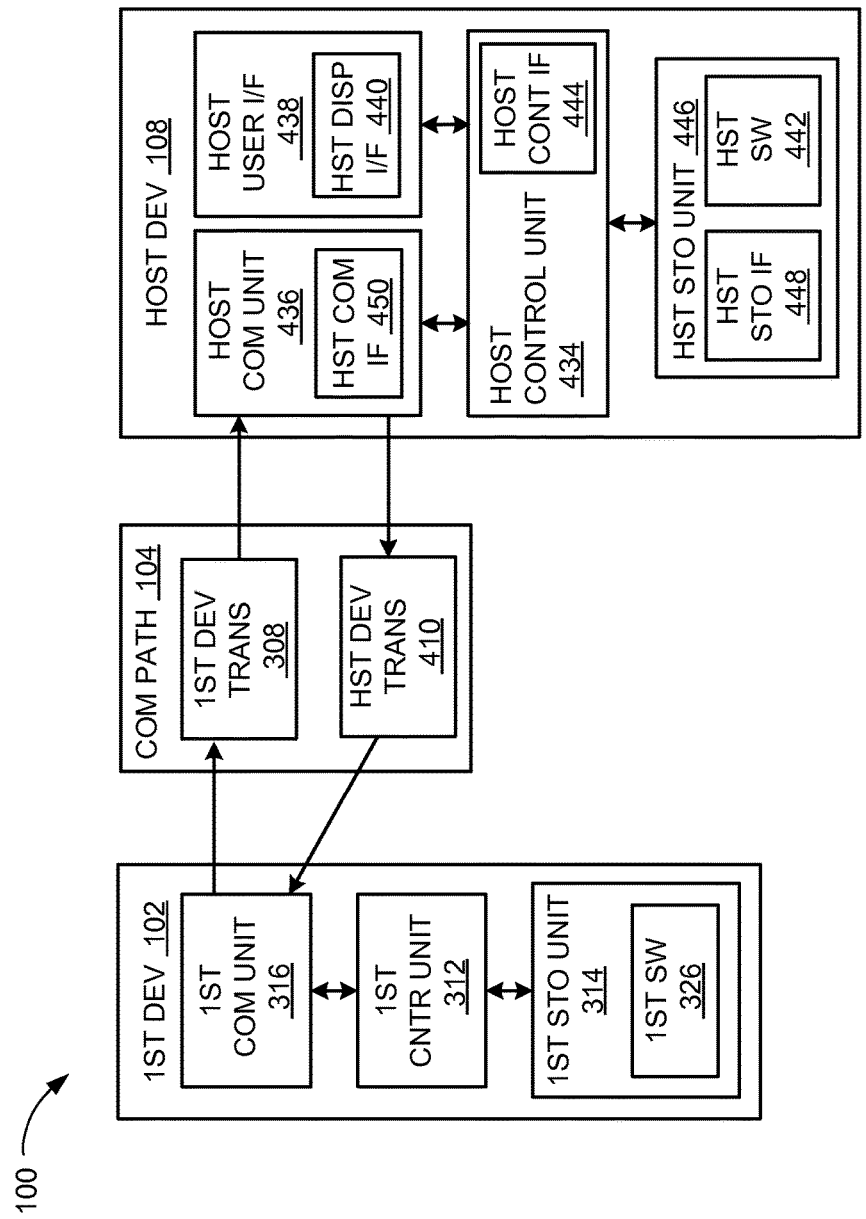
FIG. 4 is a further exemplary block diagram of the navigation system.

Referring now to FIG. 4, therein is shown a further exemplary block diagram of the navigation system 100. Along with the first device 102 and the second device 106 of FIG. 3, the navigation system 100 can include the host device 108. The first device 102 can send information in the first device transmission over the communication path 104 to the host device 108. The host device 108 can send information in a host device transmission 410 over the communication path 104 to the first device 102.

For illustrative purposes, the navigation system 100 is shown with the host device 108 as a server, although it is understood that the navigation system 100 can have the host device 108 as a different type of device. For example, the host device 108 can be a client device.

Also for illustrative purposes, the navigation system 100 is shown with the first device 102 communicating with the host device 108. However, it is understood that the second device 106 can also communicate with the host device 108 in a similar manner as the communication between the first device 102 and the host device 108, between the first device 102 and the second device 106, or a combination thereof.

For brevity of description in this embodiment of the present invention, the host device 108 will be described as a server device. The embodiment of the present invention is not limited to this selection for the type of devices. The selection is an example of an embodiment of the present invention.

The host device 108 can be optimized for implementing an embodiment of the present invention in a multiple device embodiment with the first device 102. The host device 108 can provide the additional or higher performance processing power compared to the first device 102, the second device 106, or a combination thereof. The host device 108 can include a host control unit 434, a host communication unit 436, and a host user interface 438.

The host user interface 438 allows a user (not shown) to interface and interact with the host device 108. The host user interface 438 can include an input device and an output device. Examples of the input device of the host user interface 438 can include a keypad, a touchpad, touch screen, soft-keys, a keyboard, a microphone, or any combination thereof to provide data and communication inputs. Examples of the output device of the host user interface 438 can include a host display interface 440. The host display interface 440 can include a display, a projector, a video screen, a speaker, or any combination thereof.

The host control unit 434 can execute a host software 442 to provide the intelligence of the host device 108 of the navigation system 100. The host software 442 can operate in conjunction with the first software 326, the second software 342 of FIG. 3, or a combination thereof. The host control unit 434 can provide additional performance compared to the first control unit 312.

The host control unit 434 can operate the host user interface 438 to display information. The host control unit 434 can also execute the host software 442 for the other functions of the navigation system 100, including operating the host communication unit 436 to communicate with the first device 102, the second device 106, or a combination thereof over the communication path 104.

The host control unit 434 can be implemented in a number of different manners. For example, the host control unit 434 can be a processor, an application specific integrated circuit (ASIC), an embedded processor, a microprocessor, hardware control logic, a hardware finite state machine (FSM), a digital signal processor (DSP), or a combination thereof.

The host control unit 434 can include a host controller interface 444. The host controller interface 444 can be used for communication between the host control unit 434 and other functional units in the host device 108. The host controller interface 444 can also be used for communication that is external to the host device 108.

The host controller interface 444 can receive information from the other functional units or from external sources, or can transmit information to the other functional units or to external destinations. The external sources and the external destinations refer to sources and destinations external to the host device 108.

The host controller interface 444 can be implemented in different ways and can include different implementations depending on which functional units or external units are being interfaced with the host controller interface 444. For example, the host controller interface 444 can be implemented with a pressure sensor, an inertial sensor, a microelectromechanical system (MEMS), optical circuitry, waveguides, wireless circuitry, wireline circuitry, or a combination thereof.

A host storage unit 446 can store the host software 442. The host storage unit 446 can also store the such as data representing incoming images, data representing previously presented image, sound files, or a combination thereof. The host storage unit 446 can be sized to provide the additional storage capacity to supplement the first storage unit 314.

For illustrative purposes, the host storage unit 446 is shown as a single element, although it is understood that the host storage unit 446 can be a distribution of storage elements. Also for illustrative purposes, the navigation system 100 is shown with the host storage unit 446 as a single hierarchy storage system, although it is understood that the navigation system 100 can have the host storage unit 446 in a different configuration. For example, the host storage unit 446 can be formed with different storage technologies forming a memory hierarchal system including different levels of caching, main memory, rotating media, or off-line storage.

The host storage unit 446 can be a volatile memory, a nonvolatile memory, an internal memory, an external memory, or a combination thereof. For example, the host storage unit 446 can be a nonvolatile storage such as non-volatile random access memory (NVRAM), Flash memory, disk storage, or a volatile storage such as static random access memory (SRAM).

The host storage unit 446 can include a host storage interface 448. The host storage interface 448 can be used for communication between other functional units in the host device 108. The host storage interface 448 can also be used for communication that is external to the host device 108.

The host storage interface 448 can receive information from the other functional units or from external sources, or can transmit information to the other functional units or to external destinations. The external sources and the external destinations refer to sources and destinations external to the host device 108.

The host storage interface 448 can include different implementations depending on which functional units or external units are being interfaced with the host storage unit 446. The host storage interface 448 can be implemented with technologies and techniques similar to the implementation of the host controller interface 444.

The host communication unit 436 can enable external communication to and from the host device 108. For example, the host communication unit 436 can permit the host device 108 to communicate with the first device 102, the second device 106, or a combination thereof over the communication path 104.

The host communication unit 436 can also function as a communication hub allowing the host device 108 to function as part of the communication path 104 and not limited to be an end point or terminal unit to the communication path 104. The host communication unit 436 can include active and passive components, such as microelectronics or an antenna, for interaction with the communication path 104.

The host communication unit 436 can include a host communication interface 450. The host communication interface 450 can be used for communication between the host communication unit 436 and other functional units in the host device 108. The host communication interface 450 can receive information from the other functional units or can transmit information to the other functional units.

The host communication interface 450 can include different implementations depending on which functional units are being interfaced with the host communication unit 436. The host communication interface 450 can be implemented with technologies and techniques similar to the implementation of the host controller interface 444.

The first communication unit 316 can couple with the communication path 104 to send information to the host device 108 in the first device transmission 308. The host device 108 can receive information in the host communication unit 436 from the first device transmission 308 of the communication path 104.

The host communication unit 436 can couple with the communication path 104 to send information to the first device 102 in the host device transmission 410. The first device 102 can receive information in the first communication unit 316 from the host device transmission 410 of the communication path 104. The navigation system 100 can be executed by the first control unit 312, the host control unit 434, or a combination thereof. The second device 106 can similarly communicate and interact with the host device 108 using the corresponding units and functions therein.

For illustrative purposes, the host device 108 is shown with the partition having the host user interface 438, the host storage unit 446, the host control unit 434, and the host communication unit 436, although it is understood that the host device 108 can have a different partition. For example, the host software 442 can be partitioned differently such that some or all of its function can be in the host control unit 434 and the host communication unit 436. Also, the host device 108 can include other functional units not shown in FIG. 4 for clarity.

The functional units in the host device 108 can work individually and independently of the other functional units. The host device 108 can work individually and independently from the first device 102, the second device 106, and the communication path 104.

For illustrative purposes, the navigation system 100 is described by operation of the first device 102 and the host device 108. It is understood that the first device 102, the second device 106, and the host device 108 can operate any of the modules and functions of the navigation system 100.

Figure 5:
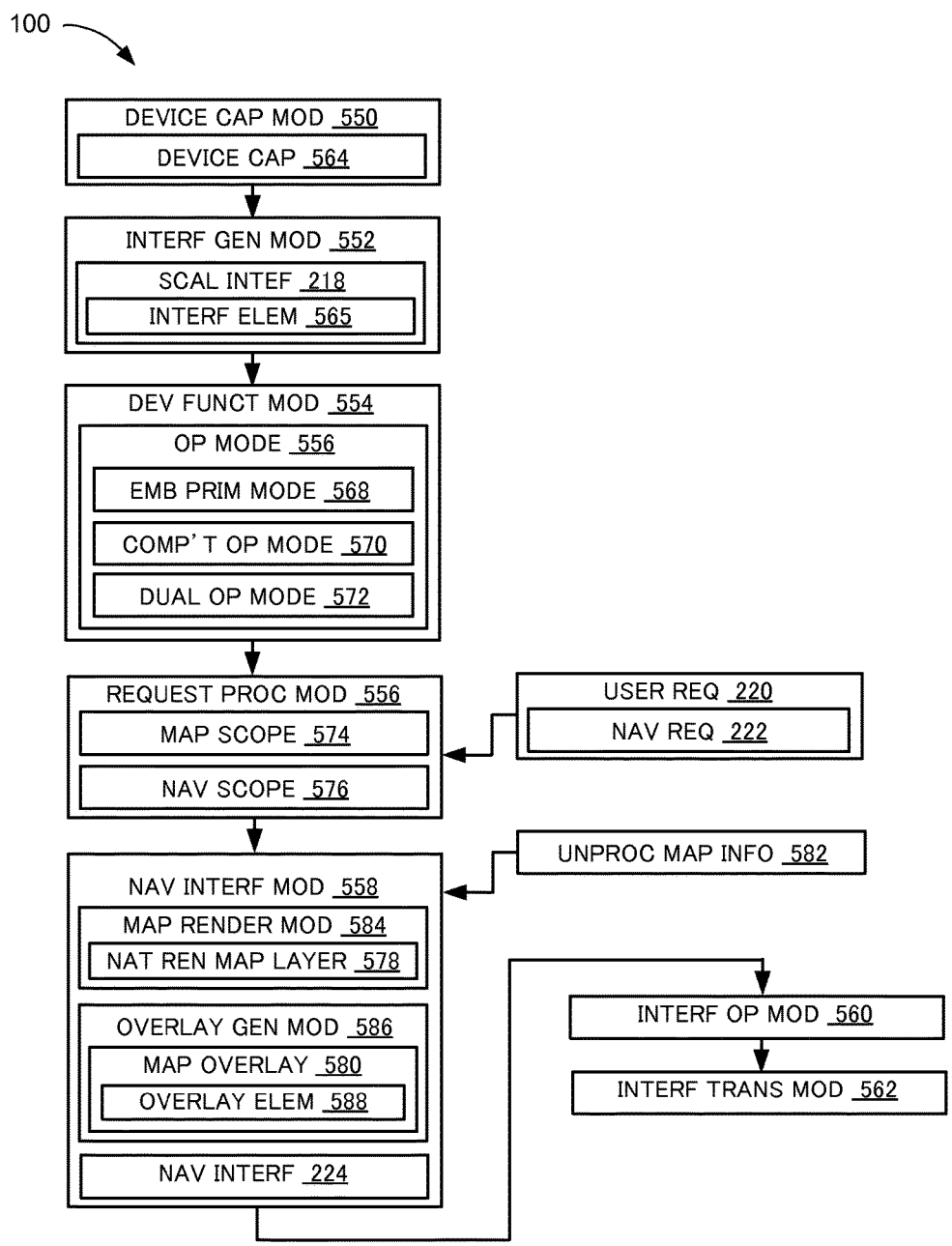
FIG. 5 is a control flow of the navigation system.

Referring now to FIG. 5, therein is shown a control flow of the navigation system 100. The navigation system 100 can include a device capability module 550, an interface generation module 552, a device functionality module 554, a request process module 556, a navigation interface module 558, an interface operation module 560, and an interface transmission module 562. The device capability module 550 can be coupled to the interface generation module 552. The interface generation module 552 can be coupled to the device functionality module 554. The device functionality module 554 can be coupled to the request process module 556. The request process module 556 can be coupled to the navigation interface module 558. The navigation interface module 558 can be coupled to the interface operation module 560. The interface operation module 560 can be coupled to the interface transmission module 562.

The device capability module 550 is for determining the operational capabilities, interface capabilities, display capabilities, physical properties, or a combination thereof of a device. The device capability module 550 can determine device capabilities 564 of the embedded device 212 of FIG. 2. The device capabilities 564 are defined as the hardware specifications or properties. For example, the device capabilities 564 of the embedded device 212 can include the operational, interface, display capabilities, and physical properties or dimension. As a specific example, the device capabilities 564 of the embedded device 212 can include resolution, such as the pixel count of the display screen for the embedded device display 216, size or dimensions, such as the length and width measurements of the display interface of the embedded device display 216 of FIG. 2, or a combination thereof.

In another example, the device capabilities 564 can include input and output capabilities. Specific examples of the device capabilities 564 for input and output of the embedded device 212 can include touch screen capability, audio interfaces, such as integrated microphones and speakers, connections to microphones and speakers, or a combination thereof. Other examples of device capabilities 564 can include buttons, dials, or other physical control mechanisms integrated with the embedded device 212, such as buttons surrounding and adjacent to the embedded device display 216, connections to buttons, dials, or other physical control mechanisms that are integrated with the vehicle, such as steering wheel or center console controls, or a combination thereof.

The device capability module 550 can determine the device capabilities 564 in a number of ways. For example, the device capability module 550 can determine the device capabilities 564 by interfacing with the first storage unit 314 of FIG. 3 to access the technical specifications or details of the particular instance of the embedded device 212 or the user vehicle specification that includes specification or details of the embedded device 212. In another example, the device capability module 550 can determine the device capabilities 564 by receiving or downloading the technical specifications or details of the particular instance of the embedded device 212 through direct or indirect interface with the embedded device 212 or the user vehicle. In a further example, the device capability module 550 can determine the device capabilities 564 by downloading or accessing the technical specifications or details of the particular instance of the embedded device 212 stored on the host storage unit 446 of FIG. 4 or from the internet through an online server via the communication path 106 of FIG. 1. The device capability module 550 can determine the device capabilities 564 upon initial connection with the embedded device 212 and can be subsequently stored in the first storage unit 314 of the mobile device 210 of FIG. 2.

The navigation system 100 can generate the scalable interface 218 with the interface generation module 552. For example, the interface generation module 552 can generate the scalable interface 218 that is customized for, unique, or specific to the embedded device 212 with interface elements 565 based on the device capabilities 564 of the embedded device 212. Interface elements 565 are defined as the graphical or visual components or elements used to generate the user interface. For example, the interface elements 565 can include buttons, menus, boarders, display areas, web sockets, and other graphical user interface components.

The interface generation module 552 can generate the scalable interface 218, for example as an arrangement of the interface elements 565 based on a general template. To continue the example, the dimensions and exact placement of the interface elements 565 can be adjusted according to the device capabilities 564. As a specific example, the interface generation module 552 can increase the relative size of a display area when the device capabilities 564 of the embedded device display 216 include display dimensions that exceed those of the general template. In another specific example, the font or icon size for display can be adjusted based on the device capabilities 564 such as screen resolution. In a further specific example, the scalable interface 218 can be adjusted or reconfigured based on the preference of the device user 226, such as inclusion or omission of interface elements 565 or size of text.

The interface generation module 552 can generate the scalable interface 218 in a number of different ways. For example, the overlay elements 588 can be rendered based on hypertext markup language (HTML), such as HTML 5 or Java™ script.

The device functionality module 554 is for determining functionality of interconnected devices. For example, the device functionality module 554 can determine the functionality of the mobile device 210, the embedded device 212, or a combination thereof when the mobile device 210 and the embedded device 212 are functionally connected based on the device capabilities 564. As described in FIG. 2, the mobile device 210 and the embedded device 212 are functionally connected when the mobile device 210 and the embedded device 212 are capable of mutual information exchange or transfer. Examples of mutual information exchange can include transmission of information from the mobile device 210 to the embedded device 212 for display on the embedded device display 216 or receipt of user input information by the mobile device 210 that is transmitted by the embedded device 212.

The mobile device 210 and the embedded device 212 can be functionally connected in a number of different ways. For example, the mobile device 210 and the embedded device 212 can be functionally connected through a direct or indirect physical connection, such as through a wired connection including a cable, Universal Serial Bus (USB), or High-Definition Multimedia Interface (HDMI) connection between the mobile device 210 and the embedded device 212 or to the vehicle which includes the embedded device 212. In another example, the mobile device 210 and the embedded device 212 can be functionally connected wirelessly, such as through a Bluetooth or WiFi connection.

The device functionality module 554 can determine an operational mode 566 for the mobile device 210, the embedded device 212, or a combination thereof. The operational mode 566 is defined as the functionality of the individual devices when functionally connected. The operational mode 566 can include various allocations of functionality, content presentation, or a combination thereof between the mobile device 210 and the embedded device 212. Examples of the operational mode 566 can include, but are not limited to an embedded primary mode 568, a complimentary operation mode 570, or a dual operation mode 572. In each of the following examples, the operational mode 566 is implemented and executed by the mobile device 210.

The embedded primary mode 568 is defined as a mode of operation wherein the embedded device 212 is primarily used for interaction with the user, such as to present content and receive user input, with minimal or no user interaction with the mobile device 210. For example, in the embedded primary mode 568, the device capabilities 564 of the mobile device 210, such as touch screen or display capability, can be disabled or suspended while functionally connected to the embedded device 212, as illustrated in FIG. 2. As a specific example, for the embedded primary mode 568, the user request 220 can be input through the embedded device 212 then transmitted to and received by the mobile device 210. To continue the specific example, processing of the user request 220 to control and operate the scalable interface 218 can be executed by the first control unit 312 of FIG. 3 of the mobile device 210, which can be subsequently transmitted to the embedded device 212 for presentation on the embedded device display 214. As a further continuation of the specific example, during the embedded primary mode 568, the mobile device display 214 can present a suspended interface operation indicator, such as a message or image that directs the user to interface with the embedded device 212 for operation of the mobile device 210. For this specific example of the embedded primary mode 568, the embedded device 212 is used for all interaction with the device user 226, such as input of the user request 220 and presentation of a response to the user request 220, while all the processing of the user request 220 and operation of the embedded device 212 is executed by the mobile device 210.

The complimentary operation mode 570 is defined as a mode of operation wherein both the embedded device 212 and the mobile device 210 can be used to receive user input, present content, or a combination thereof in a way that is complimentary, unique, non-redundant or combination thereof. Complementary, unique, or non-redundant operation can occur when the functionality of the devices are unique or non-redundant, when different content is presented on the devices, or when the devices present content differently. For example, as with the embedded primary mode 568, the interface with the device user 226 can occur primarily through the embedded device 212. However, with the complimentary operation mode 570, the mobile device 210 can be used in tandem with the embedded device 212 to supplement interaction with and presentation to the device user 226 in complimentary or non-redundant ways. As a specific example of the complimentary operation mode 570, in the situation where the device capabilities 564 of the embedded device 212 may not include a microphone to receive audio input for the user request 220, the navigation system 100 can utilize the audio input capability of the mobile device 210 to receive the user request 220. In general, for the complimentary operation mode 570, the inputs associated with the user request 220 that are received by the embedded device 212 are transmitted to and processed by mobile device 210.

As another specific example, the complimentary operation mode 570 can implement or utilize both the mobile device display 214 of the mobile device 210 and the embedded device display 216 of the embedded device 212 to present the portions of the navigation interface 224 in a way that is complimentary, unique, non-redundant, or a combination thereof. For instance, the embedded device display 216 can present a map covering a large geographic area while the mobile device display 214 can present a smaller portion or subset of the map or present information that compliments the map presented on the embedded device display 216. Further examples and details of the implementation of the complimentary operation mode 570 will be discussed below.

The dual operation mode 572 is defined as a mode of operation wherein functionally connected devices can operate or function independently from one another. For example, the mobile device 210 can retain functionality as if unconnected to the embedded device 212 while the embedded device 212 presents content generated by the mobile device 210. As a specific example, the user request 220 can be input through the embedded device 212, the mobile device 210, or a combination thereof, such that the embedded device 212 and the mobile device 210 can have redundant input functionality for receiving the user request 220. However, the user request 220 received by the embedded device 212 is transmitted to and received by the mobile device 210. To continue the specific example, processing of the user request 220 to generate, operate, or control the scalable interface 218 and the navigation interface 224 presented on the embedded device 212 can be executed by the first control unit 312 of the mobile device 210, which is subsequently transmitted to the embedded device 212 for presentation. As a further continuation of the specific example of the dual operation mode 572, during this process, the mobile device 210 can operate independently from the embedded device 212 with access to native features and programming of the embedded device 212.

The device functionality module 554 can determining the operational mode 566 for the mobile device 210, the embedded device 212, or a combination thereof based in a number of different ways. For example, the device functionality module 554 can determine the operational mode 566 as a predetermined or default setting. In another example, the device functionality module 554 can determine the operational mode 566 based on context, such as implementing the operational mode 566 of the embedded primary mode 568 when the device user 226 is driving the user vehicle to encourage driver safety. In another example of context determination by the device functionality module 554, the operational mode 566 can be determined as the dual operation mode 572 when the device user 226 is a passenger in the user vehicle. In a further example, the device functionality module 554 can determine the operational mode 566 based on user preference, which can be set or chosen by the device user 226.

The navigation system 100 can include a request process module 556 for analyzing a request by a user. For example, the request process module 556 can receive and analyze the user request 220 that can include the navigation request 222. The request process module 556 can analyze the user request 220 in a number of ways, such as by parsing the text, language, context, voice or sound analysis, or combination thereof. For the user request 220 that includes the navigation request 222, the request process module 556 can analyze the user request 220 to determine a map scope 574 and a navigation scope 576 of the navigation request 222.

The map scope 574 of the navigation request 222 is defined as the geographical area and degree of detail that will be presented in a map. For example, the map scope 574 can define the geographical boundary surrounding the user, the area around the locations associated with the navigation request 222, or the area necessary to display a travel route associated with the navigation request 222. As specific examples, the map scope 574 for the navigation request 222 of "directions to nearest bank," the map scope 574 can include a geographic region sufficient to include the current location of the device user 226 and one or more banks near the device user 226 within a specific or predetermined distance.

The navigation scope 576 is defined as the information elements associated with a request for navigation for displaying on or presenting with a map. For example, the navigation scope 576 can include information for presentation on the navigation interface 224, such as the current location of the device user 226, the travel route between the origin location and the destination location, navigation notifications, messages, or other information that would useful to the user. As specific examples, for the navigation request 222 of "directions to nearest bank," the navigation scope 576 can include the information for identifying the location of the device user 226 in association with the map scope 574 and locations of the banks near the location of the device user 226. To continue the specific example, the navigation scope 576 can include information associated with the navigation request 222, such as directions to the banks from the location of the device user 226.

For the user request 220 that includes the navigation request 222, the navigation system 100 can implement the navigation interface module 558 to present navigation related information on the mobile device 210, the embedded device 212, or a combination thereof. The navigation interface module 558 can generate the navigation interface 224, which can include maps and instructions, overlays, messages, and other information. For example, for the navigation request 222 of "show restaurants near me," the navigation interface module 558 can generate the navigation interface 224 can include audio and visual information, such as a map of the geographic area around the device user 226, markers on the map to indicate restaurants near the user, directions to the restaurants, information about the various restaurants or number of search results, audio cues that include said information, or any other information relevant to the navigation request 222.

The navigation interface module 558 can transmit a request for and receive unprocessed map information 582 for generation of the navigation interface 224. The unprocessed map information 582 is defined as the raw information used to generate or render a map and related information. The unprocessed map information 582 can be information that has not been processed to render a map. For example, the unprocessed map information 582 can include coordinates, pointers, vectors, or any other information for generating or rendering a map, but does not contain or include any rendered images or visual representations of the geographic area described by the unprocessed map information 582. The amount of information and degree of detail of the unprocessed map information 582 can be determined by the map scope 574, which can in turn be determined by the operational mode 566 and device capabilities 564, as described above.

As an example, the navigation interface module 558 can transmit a request for the unprocessed map information 582 that encompasses the map scope 574 and the navigation scope 576 to a server, such as the host device 108, through the communication path 104. To continue the example, the server, such as the host device 108, can process the request for the unprocessed map information 582 with the host control unit 434, retrieve the unprocessed map information 582 from the host storage unit 446, and transmit the unprocessed map information 582 for receipt by the mobile device 210.

The navigation interface module 558 can utilize the unprocessed map information 582 to generate the navigation interface 224 to include a natively rendered map layer 578 and a map overlay 580. The natively rendered map layer 578 is defined as a map generated on the mobile device from unprocessed or raw map information. The map overlay 580 is defined as information layered over the map to provide navigation information.

The navigation interface module 558 can generate the natively rendered map layer 578 on the mobile device 102 with a map render module 584. More specifically, the natively rendered map layer 578 is a map generated with the native hardware of the mobile device 102, such as the first control unit 312, from the unprocessed map information 582. The map render module 584 can generate one or more instances of the natively rendered map layer 578 for presentation on the embedded device 212, the mobile device 210, or a combination thereof with the unprocessed map information 582. For example, the map render module 584 can generate the natively rendered map layer 578 by rendering a map that includes geographic map features, such as rivers and mountains, and infrastructure features, such as roads, buildings, and bridges from the unprocessed map information 582. The geographic area rendered and presented by the natively rendered map layer 578 can be determined by the map scope 574, which can be determined based on the device capabilities 564 of the embedded device 212, the mobile device 210, or a combination thereof. As a specific example, the map render module 584 can generate the natively rendered map layer 578 with the unprocessed map information 582 that includes the vector based information formats, as opposed to raster images or tiles.

The map render module 584 can generate unique instances of the natively rendered map layer 578 for displaying on the embedded device display 216 of the embedded device 212 and the mobile device display 214 of the mobile device 210. In the case of the operational mode 566 of the embedded primary mode 568, the map render module 584 can generate a single instance of the natively rendered map layer 578 for displaying on only the embedded device display 216.

In the case of the operational mode 566 of the complimentary operation mode 570, for example, the map render module 584 can render one instance of the natively rendered map layer 578 for displaying on the embedded device display 216 and a different instance of the natively rendered map layer 578 for displaying on the mobile device display 214 that includes features or scope that are different from the instance of the map render module 584 for presentation on the embedded device display 216.

In one example, the natively rendered map layer 578 for the embedded device 212 can present a larger geographical area for display compared to the natively rendered map layer 578 for the mobile device 210, which can display a zoomed or subset geographical area of that presented on the embedded device 212, such as the area around the current location of the device user 226, near the destination location, or a point of interest. In another example, the natively rendered map layer 578 for the embedded device 212 and that of the mobile device 210 can presented the same geographical region with a higher degree of detail or resolution presented on the natively rendered map layer 578 for the embedded device 212, such as more streets or street names, buildings or other features that would be difficult for viewing on the mobile device 210.

The navigation interface module 558 can include an overlay generation module 586, coupled to the map render module 584. The overlay generation module 586 is for generating one or more layers of navigation related information for presentation with a rendered map. The overlay generation module 586 can generate a map overlay 580 for presenting over or integration with the natively rendered map layer 578. For example, the map overlay 580 can include information in response to the navigation request 222 such as navigation information and notification information. The overlay generation module 586 can generate one or more instances of the map overlay 580 with the navigation scope 576, the map scope 574, or a combination thereof.

The overlay generation module 586 can generate the map overlay 580 with overlay elements 588. The overlay elements 588 are defined as components to generate an overlay for presenting information associated with a request for navigation. For example, the overlay elements 588 can be depictions that represent navigation cues, such as location markers of the current location of the device user 226 or the destination, the depiction of the travel path, instructions for navigation along the travel route. In another example, the overlay elements 588 can be visual information related to the navigation request 222 including notations regarding the travel route, such as availability of alternate routes, or traffic and road hazard indicators; or locations associated with navigation request 222, such as other points of interest along the travel route.

The overlay generation module 586 can generate the various instances of the map overlay 580 that can be integrated or independent of one another. The various instances of the map overlay 580 can be independent when the a particular instance of the map overlay 580 can be moved, altered, added, or removed without affecting the other instances of the map overlay 580. For example one or more instances of the map overlay 580 can be generated with the overlay elements 588 of marker or icon representing the start location and the destination and the overlay elements 588 that include lines or traces as a visual representation of the travel route between the start location and the destination.

As one specific example, the overlay elements 588 representing start location, the destination, and the travel route can be rendered in a single instance of the map overlay 580. In another specific example, the overlay generation module 586 can generate separate instances of the map overlay 580 with the overlay elements 588 representing the start location, the destination, and the travel route. In a further example, the overlay generation module 586 can generate an instance of the map overlay 580 that include one of the overlay elements 588 as a pop-up window with a notification, such as traffic information, and a separate and independent instance of the map overlay 580 that include the overlay elements 588 representing the start location, travel route, and destination location. Further, the overlay generation module 586 can generate different instances of the map overlay 580 for presentation on the embedded device 212 or the mobile device 210.

The overlay generation module 586 can generate the map overlay 580 in a number of different ways. For example, the overlay elements 588 can be rendered based on hypertext markup language (HTML), such as HTML 5 or Java™ script.

The navigation interface module 558 can combine the natively rendered map layer 578 with the one or more instances of the map overlay 580 for presentation as the navigation interface 224 on the scalable interface 218 of the embedded device 212, the mobile device 210, or a combination thereof. In general, the navigation interface module 558 can maintain the natively rendered map layer 578 and the map overlay 580 in the navigation interface as independent, individual, and distinct layers. The natively rendered map layer 578 and the map overlay 580 can be independent when the map overlay 580 can be moved, altered, added, or removed without affecting the natively rendered map layer 578 or vice versa.

The navigation system 100 can control and manipulate the navigation interface 224 with an interface operation module 560. The interface operation module 560 can independently control or manipulate the natively rendered map layer 578 and the one or more instances of the map overlay 580 for the natively rendered map layer 578. For example, the interface operation module 560 can maintain the position of an instance of the map overlay 580 that includes a notification relative to the natively rendered map layer 578 or other instances of the map overlay 580, such as during a zoom operation that enlarges a portion of the natively rendered map layer 578 or shifts the markers in an instance of the map overlay 580. As another example, the interface operation module 560 can add or remove instances of the map overlay 580 based on context, such as removing an instance of the map overlay 580 that includes a notification when the information of the notification is no longer timely. In a further example, the interface operation module 560 can utilize the overlay generation module 586 to update one or more instances of the map overlay 580, such as a marker or flag that represents the current location of the device user 226 as the device user 226 travels along the travel route.

In certain instances, the interface operation module 560 can integrate or merge one or more instance of the map overlay 580 with the natively rendered map layer 578. For example, it can be advantageous to merge the instance of the map overlay 580 that includes the destination location with the natively rendered map layer 578 since the destination location generally does not change. In this example, the destination location could be fixed or anchored to a specific position on the natively rendered map layer 578.

The navigation system 100 can transmit the navigation interface 224 generated on the mobile device 210 to the embedded device 212 with the interface transmission module 562. The interface transmission module 562 can transmit the navigation interface 224, including the natively rendered map layer 578 and the one or more instances of the map overlay 580, to the embedded device 212 for presentation on the scalable interface 218. The interface transmission module 562 can transmit the navigation interface 224 through the communication path 104.

It has been discovered that the navigation system 100 provides improved navigation information presentation. The operational mode 566 enables the navigation system to take advantage of the device capabilities 564 of both the mobile device 210 and the embedded device 212 to present more information in multiple formats, which improves navigation information presentation.

It has also been discovered that the navigation system 100 provides streamlines information transfer. By receiving the unprocessed map information 582, as opposed to fully rendered maps, for generating the natively rendered map layer 578 on the mobile device 210 reduces the amount of information for download, which streamlines or improves information transfer.

The first software 326 of FIG. 3 of the first device 102 of FIG. 3, including the mobile device 210, can include the modules for the navigation system 100. For example, the first software 326 can include the device capability module 550, the interface generation module 552, the device functionality module 554, the request process module 556, the navigation interface module 558, the interface operation module 560, and the interface transmission module 562. The first communication unit 316 can be configured to transmit the scalable interface 218, the navigation interface 224, or a combination thereof to the second device 106, including the embedded device 212, through the communication path 104.

The first control unit 312 of FIG. 3 can execute the first software 326 to implement the device capability module 550, the interface generation module 552, the device functionality module 554, the request process module 556, the navigation interface module 558, the interface operation module 560, and the interface transmission module 562. For example, the first control unit 312 can implement the device capability module 550 to determine the device capabilities 564 of the second device 106, which can include the embedded device 212. The first control unit 312 can interface with the first storage unit 314 to store the device capabilities 564 specific to the instance of the embedded device 212.

In another example, the first control unit 312 can implement the navigation interface module 558 to receive the unprocessed map information 582 in accordance with the device capabilities 564; generate the natively rendered map layer 578 with the unprocessed map information 582; generate one or more instances of the map overlay 580 for layering over the natively rendered map layer 578; and generate the navigation interface 224 with the map overlay 580 and the natively rendered map layer 578. In a further example, the first control unit 312 can implement the interface generation module 552 to generate the scalable interface 218.

Alternatively, the host software 448 of can include the modules for the navigation system 100. For example, the host software 448 can include the device capability module 550, the interface generation module 552, the device functionality module 554, the request process module 556, the navigation interface module 558, the interface operation module 560, and the interface transmission module 562. The host communication unit 436 can be configured to transmit the scalable interface 218, the navigation interface 224, or a combination thereof to the first device 102, second device 106, including the embedded device 212, or a combination thereof, through the communication path 104.

In another example, the host control unit 434 can implement the navigation interface module 558 to receive the unprocessed map information 582 in accordance with the device capabilities 564; generate the natively rendered map layer 578 with the unprocessed map information 582; generate one or more instances of the map overlay 580 for layering over the natively rendered map layer 578; and generate the navigation interface 224 with the map overlay 580 and the natively rendered map layer 578. In a further example, the host control unit 434 can implement the interface generation module 552 to generate the scalable interface 218.

The modules of the navigation system 100 can be partitioned between the first software 326 and the host software 448. For example, the first software 326 can include the device capability module 550, the request process module 556, the navigation interface module 558, the interface operation module 560, and the interface transmission module 562. Based on the size of the first storage unit 314 of FIG. 3, the first software 326 can include additional modules of the navigation system 100. The first control unit 312 can execute the modules partitioned on the first software 326 as previously described. The first control unit 312 can implement the first display interface 210, the location unit 320, the first storage unit 314, or first communication unit 316 for operation of the navigation system 100 as described above.

The host software 342 can include the interface generation module 552 and the device functionality module 554. The host control unit 334 can execute modules partitioned on the host software 342 as previously described. The host control unit 334 can implement the host control unit 334 can implement the other hardware units, such as the host display interface 210, the host storage unit 346, or the host communication unit 336 as previously described above.

The modules described in this application can be hardware implementation or hardware accelerators in the first control unit 316 of FIG. 3 or in the host control unit 434 of FIG. 4. The modules can also be hardware implementation or hardware accelerators within the first device 102 or the host device 106 but outside of the first control unit 316 or the host control unit 434, respectively, as depicted in FIGS. 3 and 4, respectively. However, it is understood that the first control unit 316, the host control unit 434, or a combination thereof can collectively refer to all hardware accelerators for the modules.

The modules described in this application can be implemented as instructions stored on a non-transitory computer readable medium to be executed by a first control unit 312, the host control unit 434, or a combination thereof. The non-transitory computer medium can include the first storage unit 314 of FIG. 3, the host storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from generating the navigation interface 224, including the natively rendered map layer 578 and the map overlay 580, results in the movement in the physical world, such as such as the device user 226 using the navigation interface 224 to traverse the travel route to the destination location. Movement in the physical world, such as the device user 226 using the navigation interface 224 to traverse the travel route to the destination location, results in changes to the navigation interface 224 by updating the natively rendered map layer 578, the map overlay 580, or a combination thereof.

Figure 6:
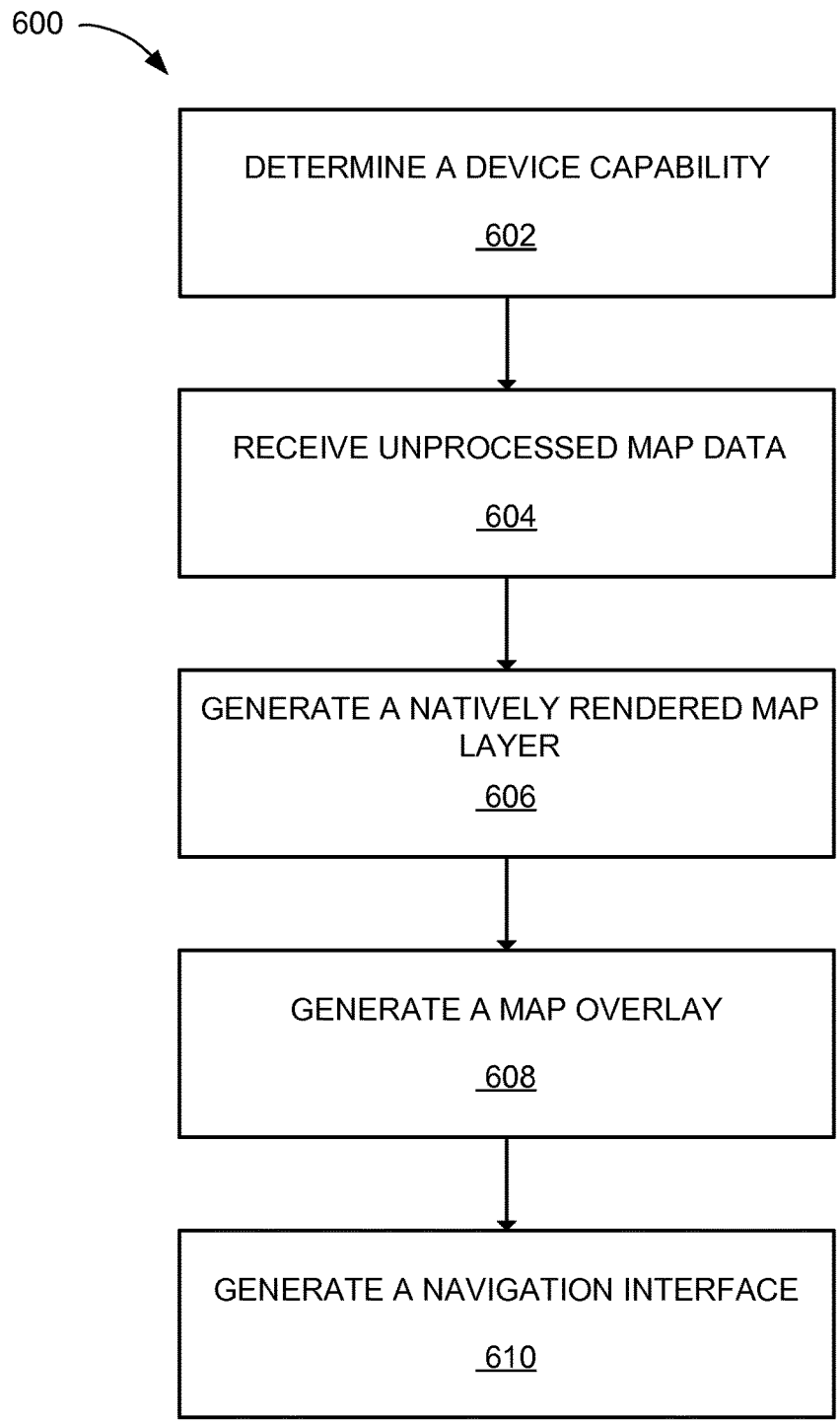
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: determining a device capability for an embedded device in a block 602; receiving unprocessed map information based on the device capability in a block 604; generating a natively rendered map layer on a mobile device with the unprocessed map information in a block 606; generating a map overlay for layering over the natively rendered map layer in a block 608; and generating a navigation interface with the map overlay and the natively rendered map layer for displaying on the embedded device in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a control unit configured to:
   determine a device capability for an embedded device including an embedded device display, wherein the embedded device is embedded in a vehicle;
   generate a scalable interface on a mobile device for displaying on the embedded device display of the embedded device, wherein the scalable interface is a user interface including a visual interface component customized to utilize a physical interface component of the embedded device;
   receive unprocessed map information based on the device capability;
   generate a natively rendered map layer on a mobile device with the unprocessed map information;
   generate a map overlay for layering over the natively rendered map layer;
   generate a navigation interface, for presenting on the scalable interface, with the map overlay and the natively rendered map layer;
   receive a user request through the scalable interface presented on the embedded device of the vehicle for processing the user request on the mobile device;
   perform control functions of the embedded device, including operation of the scalable interface, with the mobile device based on the user request; and
   a communication unit, coupled to the control unit, configured to:
   transmit the navigation interface for displaying on the embedded device.

2. The navigation system as claimed in claim 1 wherein the control unit is configured to generate the navigation interface with the map overlay and the natively rendered map layer as independent layers.

3. The navigation system as claimed in claim 1 wherein the control unit is configured to generate the scalable interface having interface element based on the device capability for the embedded device.

4. The navigation system as claimed in claim 1 wherein the control unit is configured to determine an operational mode for the mobile device and the embedded device as an embedded primary mode.

5. The navigation system as claimed in claim 1 wherein the control unit is configured to determine an operational mode for the mobile device and the embedded device as a complimentary mode.

6. The navigation system as claimed in claim 1 wherein the control unit is configured to determine an operational mode for the mobile device and the embedded device, including a dual operation mode.

7. The navigation system as claimed in claim 1 wherein the control unit is configured to determine a map scope, wherein the amount of information for the unprocessed map information is determined by the map scope.

8. The navigation system as claimed in claim 1 wherein the control unit is configured to analyze a navigation request to determine a map scope and navigation scope, wherein the unprocessed map information is based on the map scope and the navigation scope.

9. The navigation system as claimed in claim 1 wherein the control unit is configured to generate the natively rendered map layer with the unprocessed map information including vector based information formats.

10. The navigation system as claimed in claim 1 wherein the control unit is configured to generate the map overlay with a hypertext markup language.

11. A method of operation of a navigation system comprising:
    determining a device capability for an embedded device including an embedded device display, wherein the embedded device is embedded in a vehicle;
    generating a scalable interface on a mobile device for displaying on the embedded device display of the embedded device, wherein the scalable interface is a user interface including a visual interface component customized to utilize a physical interface component of the embedded device;
    receiving unprocessed map information based on the device capability;
    generating a natively rendered map layer on a mobile device with the unprocessed map information;
    generating a map overlay for layering over the natively rendered map layer;
    generating a navigation interface, for presenting on the scalable interface, with the map overlay and the natively rendered map layer for displaying on the embedded device;
    receiving a user request through the scalable interface presented on the embedded device of the vehicle for processing the user request on the mobile device; and
    performing control functions of the embedded device, including operation of the scalable interface, with the mobile device based on the user request.

12. The method as claimed in claim 11 wherein generating the navigation interface includes generating the navigation interface the map overlay and the natively rendered map layer as independent layers.

13. The method as claimed in claim 11 wherein generating the scalable interface for the embedded device includes generating the scalable interface having interface element based on the device capability.

14. The method as claimed in claim 11 further comprising determining an operational mode for the mobile device and the embedded device as an embedded primary mode.

15. The method as claimed in claim 11 further comprising determining an operational mode for the mobile device and the embedded device as a complimentary mode.

16. A non-transitory computer readable medium including instructions for operating a navigation system comprising:

determining a device capability for an embedded device including an embedded device display, wherein the embedded device is embedded in a vehicle;

generating a scalable interface on a mobile device for displaying on the embedded device display of the embedded device, wherein the scalable interface is a user interface including a visual interface component customized to utilize a physical interface component of the embedded device;

receiving unprocessed map information based on the device capability;

generating a natively rendered map layer on a mobile device with the unprocessed map information;

generating a map overlay for layering over the natively rendered map layer;

generating a navigation interface, for presenting on the scalable interface, with the map overlay and the natively rendered map layer for displaying on the embedded device;

receiving a user request through the scalable interface presented on the embedded device of the vehicle for processing the user request on the mobile device; and performing control functions of the embedded device, including operation of the scalable interface, with the mobile device based on the user request.

17. The non-transitory computer readable medium as claimed in claim 16 wherein generating the navigation interface includes generating the navigation interface the map overlay and the natively rendered map layer as independent layers.

18. The non-transitory computer readable medium as claimed in claim 16 wherein generating the scalable interface for the embedded device includes generating the scalable interface having interface element based on the device capability.

19. The non-transitory computer readable medium as claimed in claim 16 further comprising determining an operational mode for the mobile device and the embedded device as an embedded primary mode.

20. The non-transitory computer readable medium as claimed in claim 16 further comprising determining an operational mode for the mobile device and the embedded device as a complimentary mode.

* * * * *